United States Patent [19]

Kawakami et al.

[11] Patent Number: 5,079,662
[45] Date of Patent: Jan. 7, 1992

[54] COMPOUND MAGNETIC HEAD HAVING A RECORDING HEAD AND A REPRODUCING MAGNETORESITIVE HEAD INTEGRATED THEREIN

[75] Inventors: Kanji Kawakami, Mito; Yokuo Saitoh, Kaiseimachi; Tetsuo Kobayashi, Oimachi; Takayoshi Ohtsu, Odawara; Hiroshi Fukui, Hitachi, Koji Yamagata, deceased, late of Yokohama; by Tetsuji Yamagata, legal representative, Yokohama; by Reiko Yamagata, legal representative, Yokahama, all of Japan

[73] Assignee: Hitachi, Ltd., Tokyo, Japan

[21] Appl. No.: 413,329

[22] Filed: Sep. 27, 1989

[30] Foreign Application Priority Data

Sep. 30, 1988 [JP] Japan .................. 63-244445

[51] Int. Cl.⁵ .................. G11B 5/127; G11B 5/33
[52] U.S. Cl. .................. 360/113; 360/126
[58] Field of Search .................. 360/113

[56] References Cited

U.S. PATENT DOCUMENTS 3,908,194  9/1975  Romankiw .
3,921,217  11/1975  Thompson .
3,975,772  8/1976  Lin .
4,816,948  3/1989  Kamo .................. 360/113
4,841,398  6/1989  Mowry .................. 360/113
4,907,113  3/1990  Mollary .................. 360/113 X
4,907,114  3/1990  Shiiki .................. 360/113

FOREIGN PATENT DOCUMENTS 58-50622  3/1983  Japan .
59-30223  2/1984  Japan .

Primary Examiner—A. J. Heinz
Attorney, Agent, or Firm—Kenyon & Kenyon

[57] ABSTRACT

A compound magnetic head includes first and second magnetic poles arranged to face each other to define a recording gap therebetween, a magnetic film arranged between the first and second magnetic poles, a first non-magnetic film arranged between the first magnetic pole and the magnetic film to define a first reproducing gap therebetween, and a second non-magnetic film arranged between the second magnetic pole and the magnetic pole to define a second reproducing gap therebetween. The recording gap and the first and second reproducing gaps have the same width and a common center line of the gap widths parallel to the direction of movement of a magnetic recording medium.

3 Claims, 6 Drawing Sheets

COMPOUND MAGNETIC HEAD HAVING A RECORDING HEAD AND A REPRODUCING MAGNETORESITIVE HEAD INTEGRATED THEREIN

BACKGROUND OF THE INVENTION

The present invention relates to a compound recording and reproducing magnetic head having a recording head and a reproducing head which utilizes a magnetoresistive effect element compound therein, and a method for manufacturing the same. More particularly, it relates to a so-called three-legged compound magnetic head which is suitable for use with a magnetic disk unit which uses a plurality of magnetic disks.

Examples of the compound recording and reproducing magnetic head having a recording head and a reproducing head which uses a magnetoresistive effect element integrated therein are shown in U.S. Pat. No. 3,921,217 to Thompson issued on Nov. 18, 1975, U.S. Pat. No. 3,908,194 to Romankiw issued on Sept. 23, 1975, U.S. Pat. No. 3,975,772 to Lin issued on Aug. 17, 1976, JP-A-58-50622 filed in Japan on Sept. 18, 1981 by Mitsubishi Electric Corporation and published on Mar. 25, 1983, and JP-A-59-30223 filed in Japan on June 20, 1983 by International Business Machines Corporation and published on Feb. 17, 1984.

Figure 1:
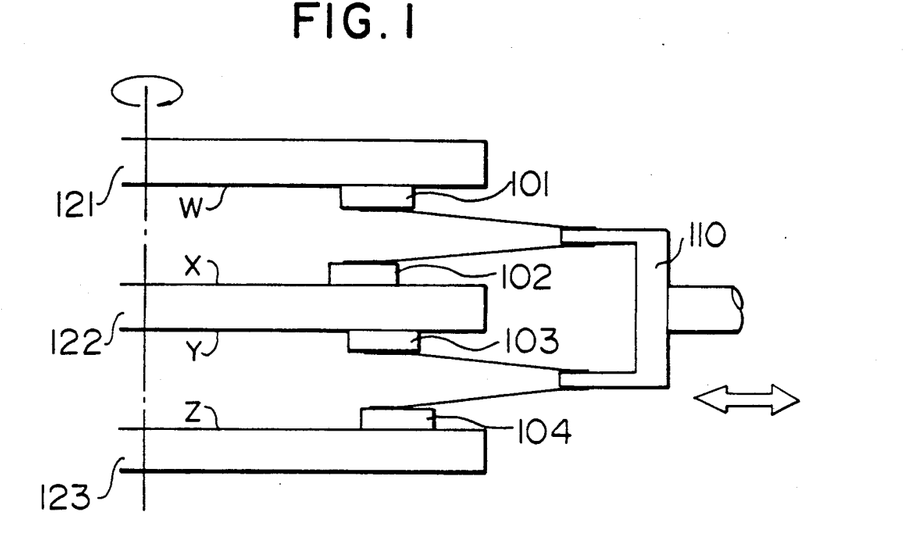
FIG. 1 shows a schematic view of a magnetic disk unit.
Figure 2:
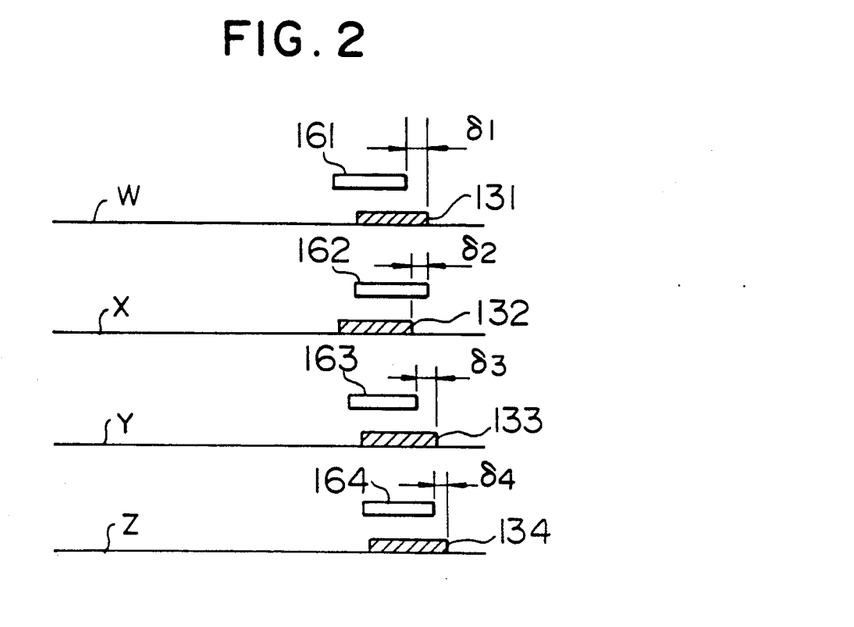
FIG. 2 shows a positional relationship between a recording track and a reproducing track in a compound magnetic head.

The magnetic disk unit to which the compound magnetic head of the present invention is applied is provided with a compound magnetic head corresponding to each of a plurality of magnetic disks 121, 122 and 123. Those compound magnetic heads 101-104 are positioned to predetermined positions on the rotating magnetic disks 121-123 by a single transport device. As shown in FIG. 2, where the recording heads of the compound magnetic heads 101-104 record data on tracks 131-134 on surfaces W-Z of the magnetic disks by the actuation of the transport means 110, it is necessary to align effective reproducing regions (reproducing gap widths) 161-164 to the recording tracks 131-134 to precisely reproduce the data recorded on the recording tracks 131-134.

However, if the recording gaps and the reproducing gaps 161-164 have deviations $\delta_1$-$\delta_4$ for each of the compound magnetic heads 101-104 as shown in FIG. 2, it is necessary to sequentially move the reproducing heads 161-164 to precisely align to the recording tracks in accordance with the respective deviations $\delta_1$-$\delta_4$ in order to precisely read the series of data of the tracks 131-134. As a result, a long transport time is required before the reproduction is started. Because of a trend of high recording density in a recent magnetic disk unit, the track width is very narrow, for example 6-20 μm, and it must be aligned within a range which is no larger than 5-10% of the effective width. Thus, high precision positioning is required.

None of the references cited above teaches a relative positional relationship between the recording head and the reproducing head of the compound head.

SUMMARY OF THE INVENTION

The present invention provides a compound recording and reproducing magnetic head which can reproduce data recorded on magnetic disks in a short time when it is used with a magnetic disk unit which uses a plurality of magnetic disks, and a method for manufacturing the same.

The present invention also provides a method for manufacturing a compound magnetic head in a simple manufacturing process.

In order to achieve these results, the compound magnetic head of the present invention comprises first and second magnetic poles arranged to face each other to define a recording gap therebetween, a magnetic film arranged between the first and second magnetic poles, a first non-magnetic film arranged between the first magnetic pole and the magnetic film to define a first reproducing gap therebetween, and a second non-magnetic film arranged between the second magnetic pole and the magnetic film to define a second reproducing gap therebetween. The width of the recording gap and the widths of the first and second reproducing gaps are equal, and center lines of the gap widths parallel to the direction of relative movement between magnetic recording media and the head in the gap widths are common.

The method for manufacturing the compound magnetic head in accordance with the present invention comprises a step of sequentially laminating a first non-magnetic film layer, a magnetic film layer, a second non-magnetic film layer and a second magnetic pole layer on a first magnetic pole layer, a step of masking one of the first and second magnetic pole layers over a predetermined area in the direction of lamination, a step of etching off unmasked areas of the layers extending from the masked magnetic pole layer to the non-magnetic film layer so that the magnetic pole layer, the magnetic film layer and the non-magnetic layer after the etching have substantially same width and a common width center.

In the compound magnetic head of the present invention, the centers of the recording gap width and the reproducing gap width align and the widths are equal. Accordingly, where the compound magnetic head of the present invention is used with the magnetic disk unit which has a plurality of magnetic disks, the positioning of the other compound magnetic heads is not necessary once one compound magnetic head is positioned. Accordingly the reproducing time is shortened.

In the method for manufacturing the compound magnetic head of the present invention, the widths of the recording gap and the reproducing gap are rendered equal in one etching process. Accordingly, the manufacturing process is simplified.

DETAILED DESCRIPTION OF THE PREFERRED EMBODIMENTS

Figure 3:
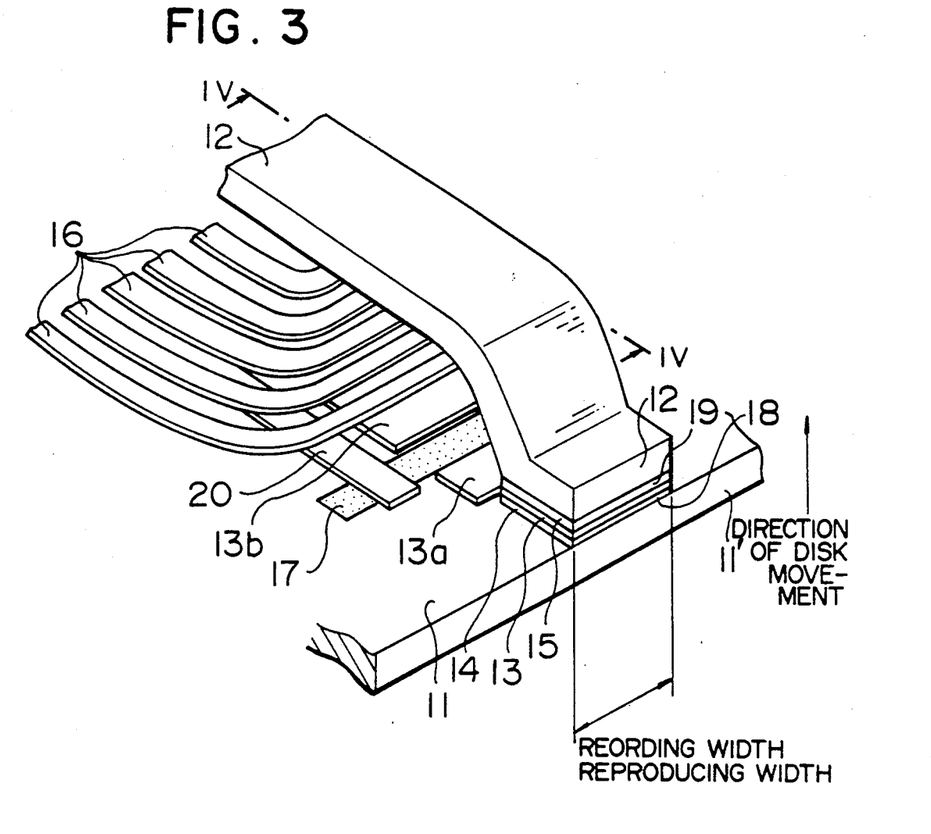
FIG. 3 shows a first embodiment of a compound magnetic head of the present invention.
Figure 4:
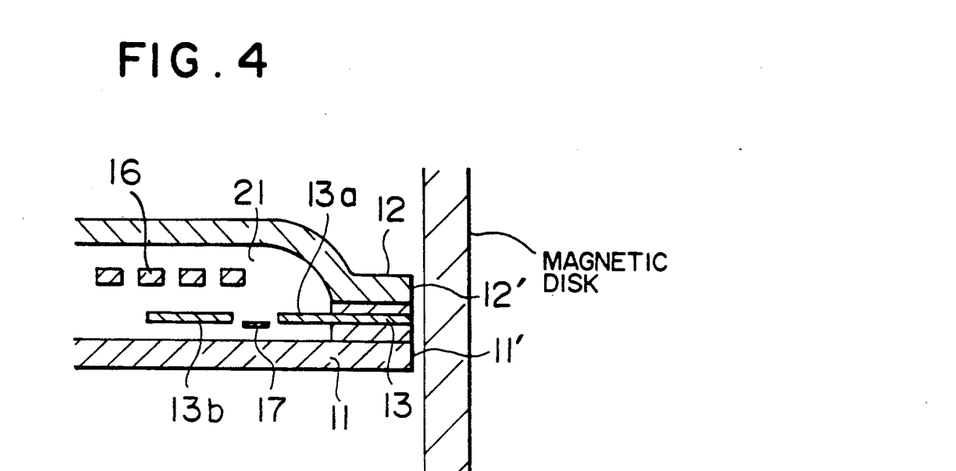
FIG. 4 shows a sectional view taken along a line IV—IV of FIG. 3.
Figure 5A:
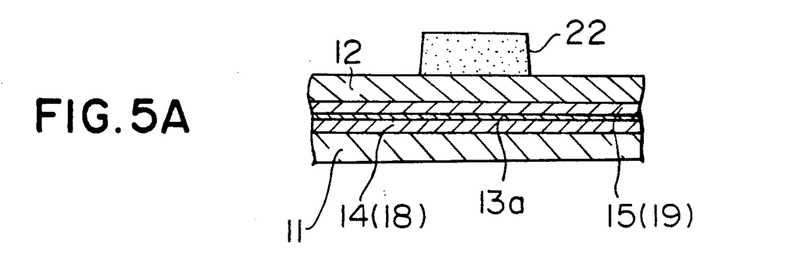
FIGS. 5A and 5B show a manufacturing process of the compound magnetic head in accordance with the first embodiment.
Figure 5B:
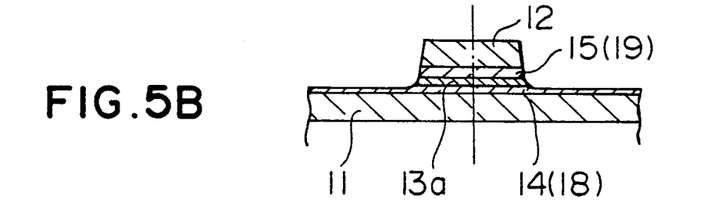
Figure 6:
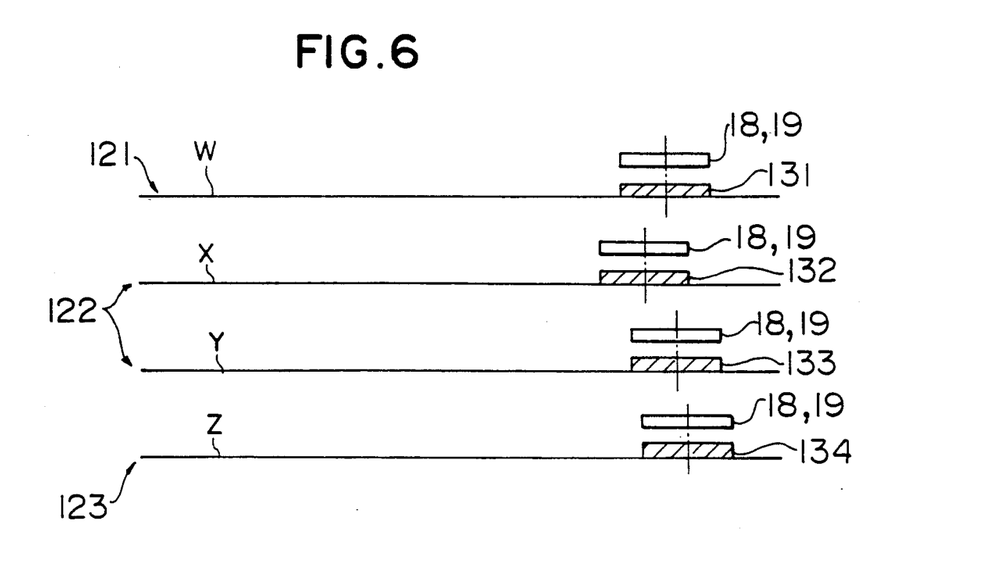
FIG. 6 shows a magnetic disk unit to which the compound magnetic head of the present invention is applied.

FIG. 3 shows a fragmental perspective view of a compound recording and reproducing magnetic head in accordance with a first embodiment of the present invention. FIG. 4 shows a sectional view of the head taken along a line IV—IV. FIGS. 5A and 5B show an etching process for gap areas of the compound magnetic head. FIG. 6 shows a positional relationship between a magnetic disk recording track and a reproducing gap.

As shown in FIGS. 3 and 4, the compound magnetic head of the present embodiment comprises first and second magnetic cores (magnetic pole layers) 11 and 12, a magnetic film 13 for a reproducing magnetic pole, and first and second non-magnetic films 14 and 15.

The first and second magnetic cores 11 and 12 face each other, and a recording gap (recording width) is defined by the width of the facing plane 12' of the second magnetic core 12 which faces a magnetic disk 121. When the first and second magnetic cores 11 and 12 are positioned on the magnetic disk and a current is supplied to an electrical winding 16, the magnetic cores introduce magnetomotive forces so that a recording magnetic field is developed in the magnetic gap between the magnetic cores 11 and 12. A signal determined by a change of direction of the current is recorded on the magnetic disk as a change of direction of residual magnetism. It is preferable that the first and second magnetic cores 11 and 12 are thick enough to prevent magnetic saturation in the recording mode. Usually, it is 1-4 $\mu$m.

The magnetic film is disposed between the first and second magnetic cores 11 and 12. More specifically, the magnetic film is constructed by one flux guide 13a of two flux guides 13a and 13b laminated on a common plane between the first and second magnetic cores 11 and 12. The flux guides 13a are arranged on the opposite sides of the magnetoresistive effect element 17 whose resistance varies with the magnitude of magnetism. The magnetoresistive effect element 17 is connected to an electrode 20.

The first and second non-magnetic films 14 and 15 are disposed between the flux guide 13a and the first and second magnetic cores 11 and 12, and they define first reproducing gap 18 and second reproducing gap 19, respectively. The first reproducing gap 18 is formed in the facing plane 11' between the magnetic disk, and the magnetic film 13 and the first magnetic core 11, and the second reproducing gap 19 is formed in the facing plane 12' between the magnetic disk, and the magnetic film 13 and the second magnetic core 12.

When the magnetic head is positioned on the magnetic disk, a magnetic field leaks at an area at which the direction of residual magnetism recorded on the magnetic disk changes, in accordance with the magnitude and the direction of the residual magnetism. If the flux guide 13a (the magnetic film 13) is located in the area of the leakage magnetic field and attracts the magnetic fluxes of the leakage magnetic field, the magnetic fluxes excite the magnetoresistive effect element 17 and also pass through the flux guide 13b to form a first reproducing gap path extending through the first magnetic core 11 and back to the magnetic disk, or a second reproducing gap path extending through the second magnetic core 12 and back to the magnetic disk. Through the change of the resistance of the magnetoresistive effect element 17, the signal recorded on the magnetic disk is reproduced.

When the flux guide 13a forms the first reproducing gap path or the second reproducing gap path by attracting the magnetic fluxes of the leakage magnetic field, it is desirable that the thicknesses of the first and second non-magnetic films 14 and 15 are equal so that the resistances and changes thereof of the magnetoresistive effect element 17 in both paths are equal.

In the present embodiment, where high density recording, such as 30,000 magnetic reversals per inch is used, the thicknesses of the flux guide 13a and the first and second non-magnetic films 14 and 15 are 0.15-0.3 $\mu$m, and the recording gap (recording width) is 0.45-0.9 $\mu$m.

In FIG. 4, numeral 21 denotes a resin insulative film arranged between the second magnetic core 12 and the second non-magnetic film 15. It is filed at areas other than the gaps.

The recording gap, the first reproducing gap 18 and the second reproducing gap are formed to have the same width and a common center line of the gap widths.

A method for manufacturing the compound magnetic head shown in FIGS. 3 and 4 is now explained. As shown in FIG. 5A, the first non-magnetic film 14, the flux guide 13a, the second non-magnetic film 15 and the second magnetic core 12 are sequentially laminated on the first magnetic core 11. Then, a patterned mask 22 made of $Al_2O_3$ or $SiO_2$ for forming the recording gap is laminated on the second magnetic core 12. As shown in FIG. 5B, the layers from the second magnetic core 12 to the flux guide 13a are collectively etched off by ion milling. In this manner, the recording gap between the first and second magnetic cores 11 and 12, the first reproducing gap 18 between the flux guide 13a and the first magnetic core 11, and the second reproducing gap 19 between the flux guide 13a and the second magnetic core 12 are formed to have substantially same width and the gaps have common center line. To this end, it is necessary to collectively etch off the layers from the second magnetic core 12 to the magnetic film 13 during the etching process. To this end, the depth of etching is controlled. For example, the thickness of the mask 22 is properly selected, the etching time is properly selected, or the type of ion gas is properly selected to control the depth of etching.

In FIG. 5B, the first non-magnetic film 14 is not completely removed but it remains on the first magnetic cores 11 with certain thickness. However, since the first reproducing gap 18 is defined by the width of the flux guide 13a which is the magnetic film, there is no problem in the characteristic even if the first non-magnetic film 14 is not completely removed.

The operation of the compound magnetic head of the first embodiment is now explained. It is assumed that a plurality of compound magnetic heads constructed in the manner described above are used, they are mounted on a single transport means 110 as shown in FIG. 1 and they are used with a magnetic disk unit in which the compound magnetic heads are positioned to predetermined positions on a plurality of magnetic disks 121-123. As described above, the recording gap, the first reproducing gap 18 and the second reproducing gap 19 of the compound magnetic head have substantially same width and the gaps have a common center line. Accordingly, when the series of data recorded on the magnetic disks 121-123 are to be reproduced, it is possible to collectively align the first and second reproducing gaps 18 and 19 of the respective compound magnetic heads to the recording tracks 131-134 of the planes W-Z of the magnetic disks 121-123 by positioning one of the compound magnetic heads by the transport means 110.

As a result, it is not necessary to individually and sequentially position the compound magnetic heads as has been done in the past, and the reproducing time can be substantially shortened.

In the manufacturing process for the first embodiment, the recording and reproducing gaps of the compound magnetic head can be formed in one etching process. Accordingly, the manufacturing process time is reduced.

Figure 7:
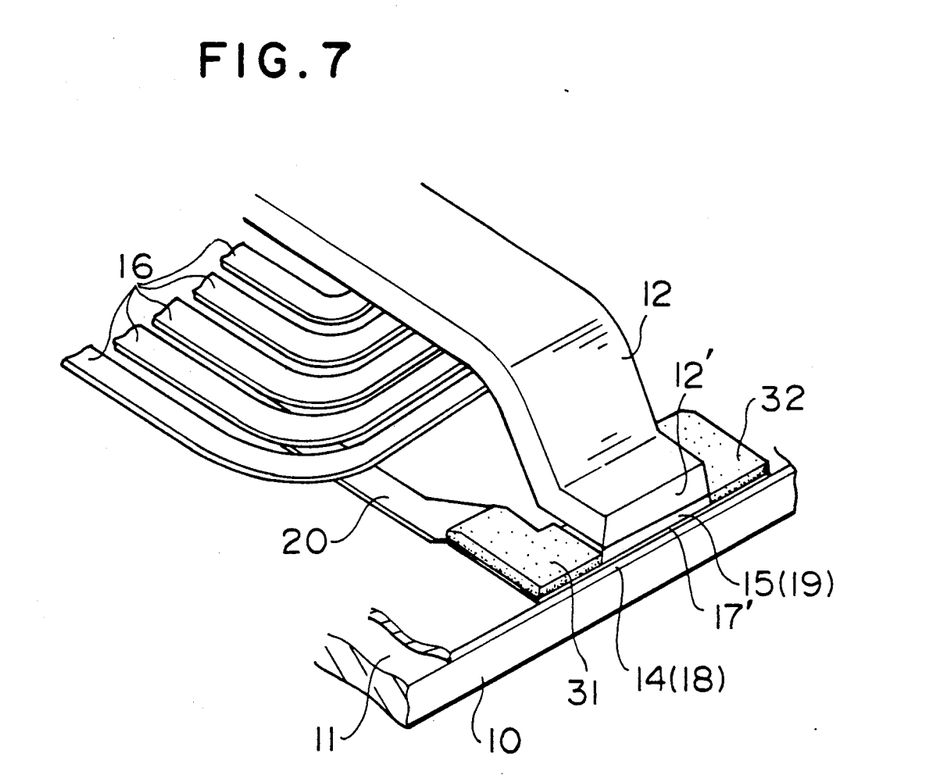
FIG. 7 shows a second embodiment of the compound magnetic head of the present invention.

FIGS. 7 and 8 show a second embodiment of the present invention.

The present embodiment differs from the first embodiment in that a magnetoresistive effective element 17' is used as a magnetic film for the reproducing magnetic pole.

The magnetoresistive effect element 17' is formed between the first and second magnetic cores 11 and 12 and has a wider width than the width of the facing plane 12' of the second magnetic core 12, that is, the width of the recording gap. Good conductors 31 and 32 are arranged on the areas of the magnetoresistive effect element 17' which extend beyond the second magnetic core 12 (the opposite sides of the magnetoresistive effect element 17' in the present embodiment) in order to impede the magnetoresistive effect function in those areas. The good conductors 31 and 32 are shorted to the magnetoresistive effect element 17' at the contact areas thereof to significantly reduce the resistivity compared to that in the areas not in contact with the good conductors so that the areas of the magnetoresistive effect element in contact with conductors 31 and 32 do not actually function as a magnetoresistive effect element. They are very thin films so that they do not electrically short the first and second magnetic cores 11 and 12.

For example, when the magnetoresistive effect element 17' is a two-element permalloy made of Ni-Fe having an electric resistivity of 16 $\mu\Omega$·cm and a thickness of 20-50 nm, the good conductors 31 and 32 are formed of gold having an electrical resistivity of 2 $\mu\Omega$·cm and a thickness of 200 nm so that a ratio of resistances of the contact area and the non-contact area of the magnetoresistive effect element 17' is no larger than 1/32. This arrangement is easily made in production. The sensitivity of the contact area of the magnetoresistive effect element becomes 1/32 of the sensitivity of another area of the magnetoresistive element at the reproducing gap, so that no reproduction is substantially made other than at reproducing gap. The signal reproduced by the contact area of the magnetoresistive element is negligible (lower than −30 db).

Accordingly, only the portion of the magnetoresistive effect element 17' which faces the second magnetic core 12 functions as the reproducing gap.

Figure 8A:
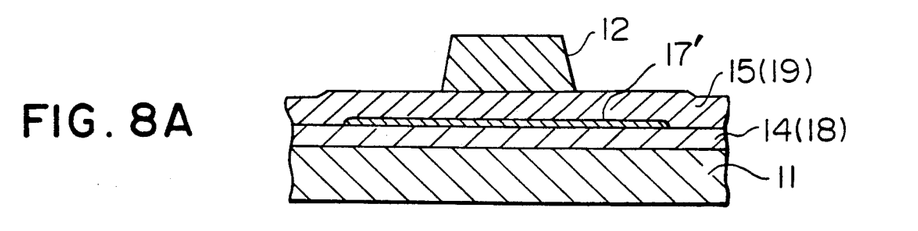
FIGS. 8A, 8B, 8C and 8D show a manufacturing process of the compound magnetic head in accordance with the second embodiment.
Figure 8B:
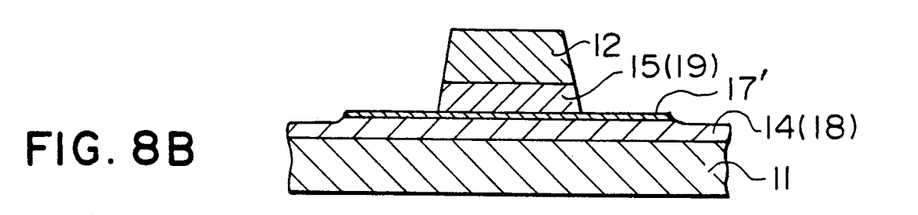

In manufacturing such a compound magnetic head, the first non-magnetic film 14, the magnetoresistive effect element 17', the second non-magnetic film 15 and the second magnetic core 12 are sequentially laminated on the first magnetic core 11. Then, the second magnetic core 12 is etched off as shown in FIG. 8A. Then, as shown in FIG. 8B, the second non-magnetic film 15 is etched off while using the etched second magnetic core 12 as a pattern mask to expose the magnetoresistive effect element 17'. In this case, the surface of the magnetoresistive effect element 17' may be etched, but if the second non-magnetic film 15 is made of silicon insulative material such as SiO, $SiO_2$ or $Si_3N_4$, the etching by fluorine plasma may be used so that the second non-magnetic film 15 is exactly etched without damaging the magnetoresistive effect element 17'.

Figure 8C:
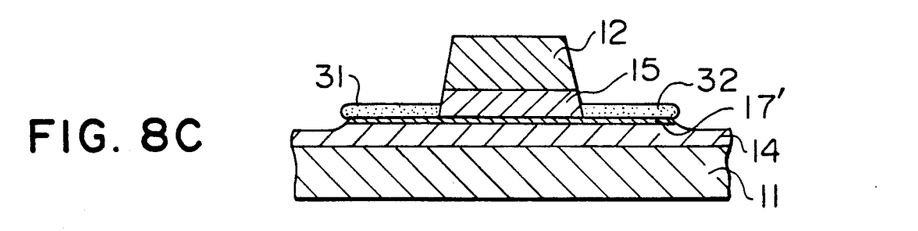

Then, as shown in FIG. 8C, the good conductors 31 and 32 are laminated by electrolyte plating at the areas of the magnetoresistive effect element 17' which extend beyond the magnetic core 12, in order to impede the magnetoresistive effect function in those areas of the magnetoresistive effect element 17'. Instead of electrolyte plating the good conductors 31 and 32, metal such as Co, Al or another element such as Sm may be ion-implanted to those areas of the magnetoresistive effect element 17' to significantly increase a coercive force in those areas, that is, to deteriorate the magnetic function of those areas so that the magnetoresistive effect function in those areas is impeded.

Through the above process, the first and second reproducing gaps 18 and 19 and the recording gap are formed to have substantially the same width and a common center line for the widths.

Figure 8D:
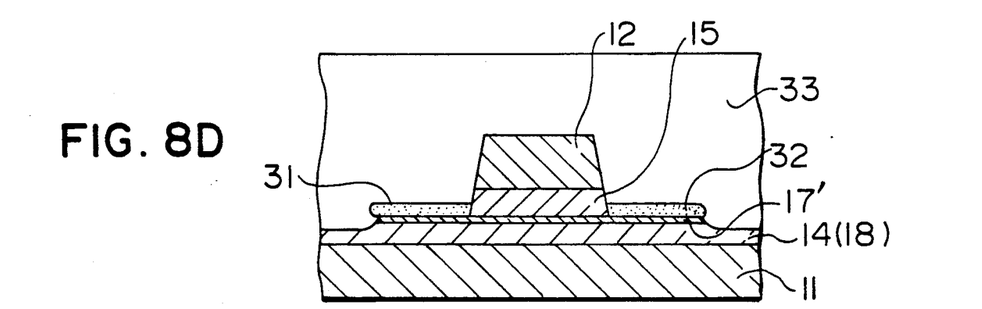

Then, as shown in FIG. 8D, a protective film 33 is laminated to complete the compound magnetic head.

In the second embodiment, other methods for impeding the magnetoresistive effect function of the extended areas of the magnetoresistive effect element 17' may be applied.

Figure 9:
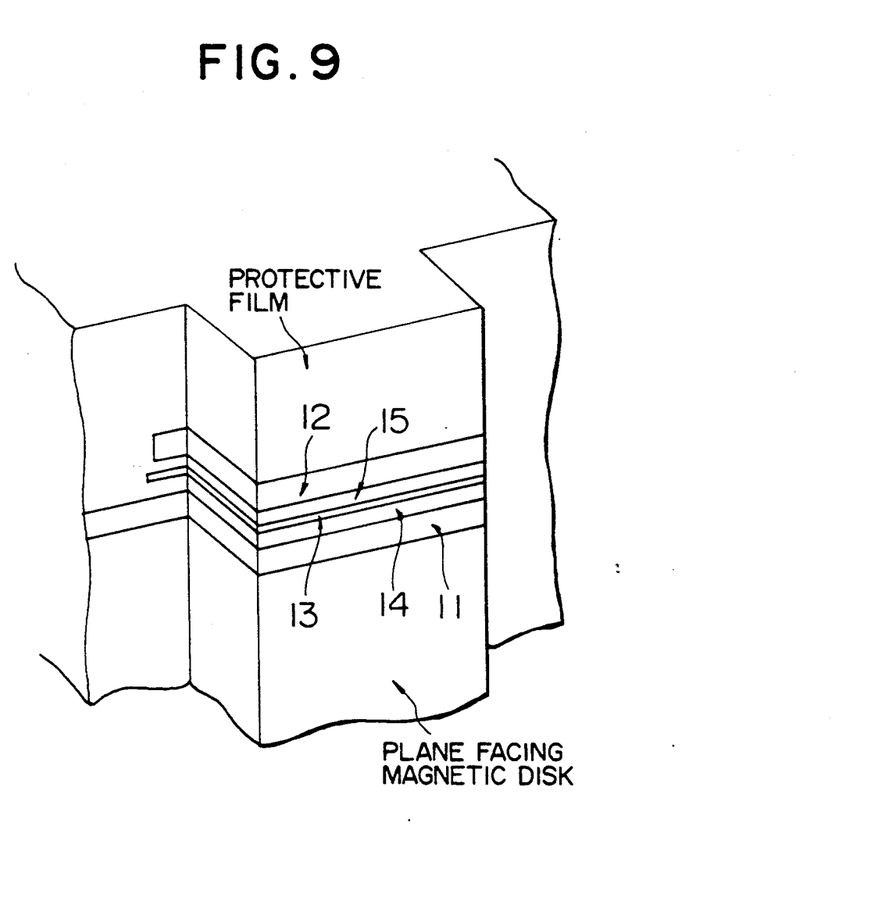
FIG. 9 shows a third embodiment of the compound magnetic head of the present invention.

FIG. 9 shows a third embodiment of the compound magnetic head of the present invention. In the manufacturing method for the third embodiment, the direction of etching is different from that in the first and second embodiments.

In the manufacturing methods for the first and second embodiments, the etching is done in the direction of lamination of the layers. In the third embodiment, the etching is done along a sectional plane which is parallel to the direction of lamination of the layers, that is, in the direction of the plane facing the magnetic disk.

The first non-magnetic film layer 14, the magnetic film (magnetoresistive effect element) layer 13, the second non-magnetic film layer 15 and the second magnetic pole layer 12 are sequentially laminated on the first magnetic pole 11. Then, the first and second magnetic pole layers 11 and 12, the first and second non-magnetic film layers 14 and 15 and the magnetic film layer 13 are masked over predetermined areas (the recording gap width and the reproducing gap width) on a sectional plane parallel to the direction of lamination, and the layers other than the masked areas are etched off. As a result, the widths of the remaining layers have substantially the same width and the center lines of the widths align. The etching may be done by plasma etching or ion milling as is done in the first and second embodiments. This manufacturing method may be applied to any of the compound magnetic heads of the first and second embodiments.

In general, the magnitude of the signal reproduced by the magnetic head depends on the distance between the plane of the magnetic head which faces the magnetic recording medium (magnetic disk or magnetic tape) and the surface of the magnetic recording medium, that is, a floating height of the magnetic head, and a linear recording density. This dependency is known from a relationship known as Wallace's equation. The magnitude of the reproduced output signal is inversely proportional to the floating height and the index of the linear recording density. Accordingly, if the floating height is doubled, the output signal is reduced to one quarter. When the linear recording density in the magnetic disk unit is 20 Kbits per inch, the floating height is 0.2-0.3 μm. Accordingly, in the third embodiment, those areas which are not intended to contribute to the recording and reproducing (the areas other than the recording and reproducing gaps) need be etched off by 1 μm at most. Thus, the etching depth may be very small and the manufacturing process time is reduced.

What is claimed is:

1. A compound magnetic head for recording and reproducing signals to and from a recording medium through a relative movement between the magnetic head and the recording medium, comprising:

first and second magnetic poles arranged to face each other to define a recording gap therebetween;

a magnetic film arranged between said first and second magnetic poles;

a first non-magnetic film arranged between said first magnetic pole and said magnetic film to define a first reproducing gap therebetween;

a second non-magnetic film arranged between said second magnetic pole and said magnetic film to define a second reproducing gap therebetween;

said recording gap and said first and second reproducing gaps having the same width and a common center line of the gaps parallel to the direction of the relative movement;

wherein a distance across a face of said second magnetic pole defines a first recording gap width;

wherein said magnetic film is formed by a magnetoresistive effect element, said magnetoresistive effect element having areas extending in the direction of the width on either side of and beyond the recording gap width, and the extended areas including means for canceling the magnetoresistive effect in the regions outside of the recording gap width; and a pair of electrodes connected to and across the width of said extended areas of said magnetoresistive effect element, wherein a potential difference applied to said electrodes produces a current flowing in said magnetoresistive effect element substantially parallel to a plane of the magnetic head opposing the magnetic recording medium.

2. A compound magnetic head according to claim 1, wherein said means for cancelling the function of the magnetoresistive effect includes good conductors having a small electric resistivity contacted to the extended areas, said electrodes being connected to said good conductors.

3. A compound magnetic head according to claim 1, wherein the extended areas of said magnetoresistive effect element are made of a base material ion-implanted with another element to make the base material have high coercive force or low permeability.

* * * * *

UNITED STATES PATENT AND TRADEMARK OFFICE
CERTIFICATE OF CORRECTION

PATENT NO. : 5,079,662
DATED : January 7, 1992
INVENTOR(S) : Kanji Kawakami, et. al.

It is certified that error appears in the above-indentified patent and that said Letters Patent is hereby corrected as shown below:

On the Title page, item [54], col. 1, line 3, change "MAGNETORESTIVE" to-- MAGNETORESISTIVE--.
Column 1, line 4, change "MAGNETORESITIVE" to -- MAGNETORESISTIVE--.
Column 2, line 33, after "substantially" insert --the --.
Column 3, line 6, after "DETAILED DESCRIPTION" delete "OF THE"--.
Column 3, line 7, delete "PREFERRED EMBODIMENTS"--.
Column 3, line 44, after "13a" insert --and 13b--.
Column 4, line 16, after "inch" insert --,--.
Column 4, line 43, after "substantially" insert --the--.
Column 4, line 44, before "common" insert --a--.
Column 4, line 57 change "characteristic" to --characteristics--.
Column 5, line 2, before "same" insert --the--.
Column 23, change "effective" to --effect--.
Column 41, after "element" insert --17'--.

Signed and Sealed this

Twenty-eighth Day of September, 1993

BRUCE LEHMAN

Attest:

Attesting Officer

Commissioner of Patents and Trademarks